March 11, 1969     H. K. LOTZ     3,432,366
TORCH CONTROL
Filed Sept. 10, 1965     Sheet _1_ of 2
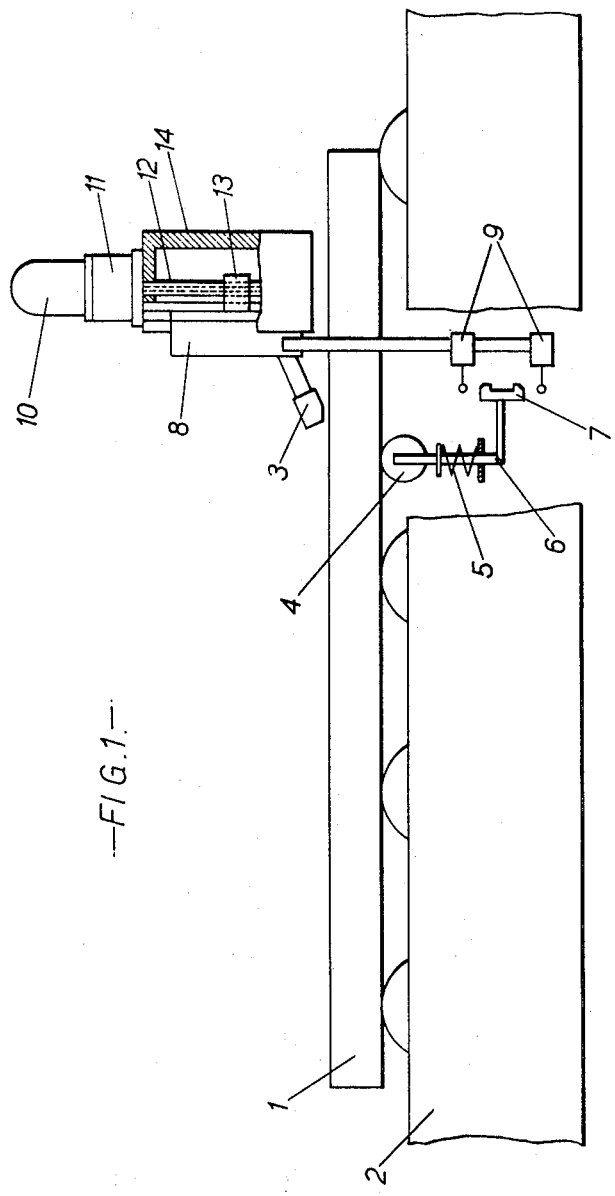
-FIG.1.-
INVENTOR:
Herst Karl Lotz
BY

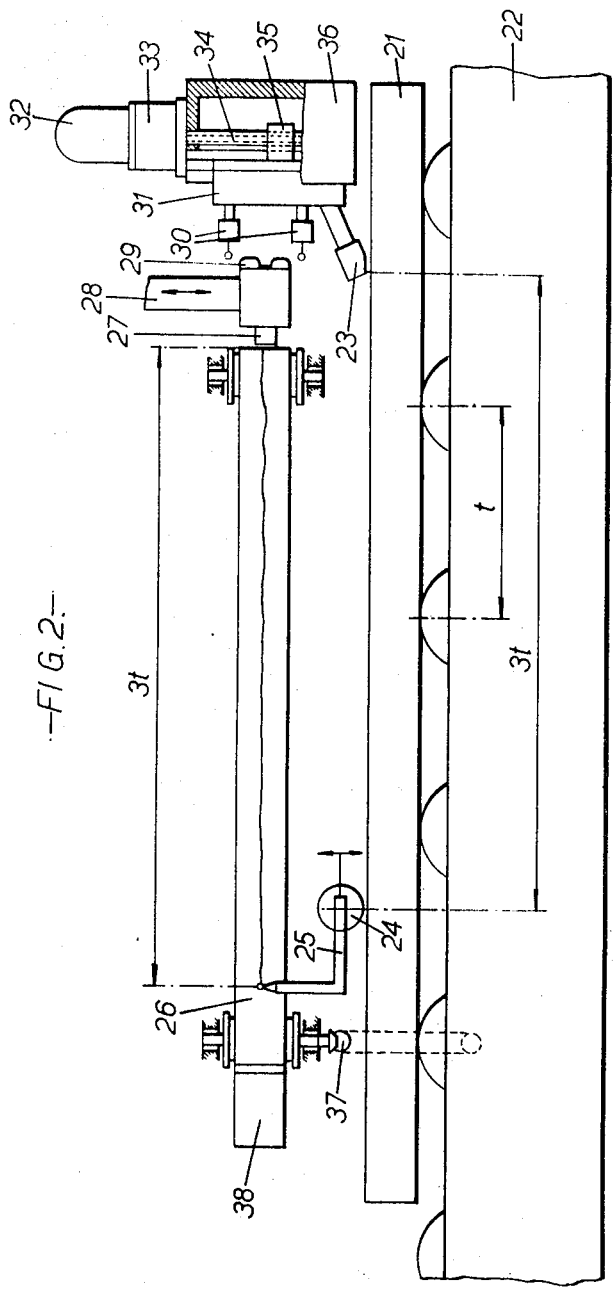

United States Patent Office 3,432,366
Patented Mar. 11, 1969

3,432,366
TORCH CONTROL
Horst K. Lotz, Frankfurt am Main, Germany, assignor to Messer Griesheim G.m.b.H., Frankfurt am Main, Germany, a corporation of Germany
Filed Sept. 10, 1965, Ser. No. 486,406
Claims priority, application Germany, Sept. 19, 1964, M 62,498
U.S. Cl. 148—9.5            7 Claims
Int. Cl. B23k 7/10; B26f 3/06; B23q 15/00

ABSTRACT OF THE DISCLOSURE

An automatic control of the distance of the nozzle of a torch from a workpiece by adjustment of the nozzle in response to signals received from scanning of the surface of the workpiece in a region unaffected by the flame from the nozzle, as adjusted.

Description of the prior art

In the steel producing industry flaming is operated for descaling faulty surfaces of steel ingots, slabs and billets. Thus, with one or more flame torches the material is brought by means of an oxygen-fuel gas flame to igniting temperature in order then to be burnt and melted, the burning slag and the liquid steel being forcibly propelled in front of the torch by the kinetic energy of the flame jet. A corresponding movement of the workpiece or the machine supporting the torch ensures the continuation of the process over the length of the workpiece.

It is thus necessary to hold the torch in a definite spaced relationship to the workpiece. This nozzle clearance is obtained in known machines as follows:

(a) The flame torches fitted with runners or the like are supported with considerable reduced weight on the workpiece and slide over the surface of the flame movement.

(b) Feeler rollers are arranged in the proximity of the torch, below or adjacent to it. The movements of these feeler rollers following the workpiece surface are used, for example by means of lever rods, for switching on and off a motor which raises or lowers the torch to the required nozzle distance.

Summary of the invention

It is an object of the invention to simplify and improve known feeling and control methods to such an extent that the surface may be flamed readily even in the case of ingots which have become somewhat distorted on cooling and have a curvature in a longitudinal or transverse direction.

Description of the preferred embodiments

According to the invention feeling or scanning of the workpiece to be flamed on its underside takes place exactly at the point of impact of the flame on the workpiece surface so that the scanning is effected at a point unaffected by the flame to avoid damage to the scanning device. Feeling however may be effected also on the most favourable or ideal point, before it comes into the flame region. The position of the workpiece on feeling will then have to be exactly equivalent to the position on flaming, i.e. the conveying means, such as roller track or trolley with rails is so contructed and the position of the feeling device so selected that the theoretically most favourable or ideal feeling can be reproduced advancing in time and location. The level ascertained by a feeler roller may constantly be compared with the position of the torch.

An apparatus for carrying out the method in accordance with the invention in an advantageous further development of the invention may have switching cams for the feeler roller and limit switches for the torch, which are so arranged in such a position relative to one another that, if the relation between the scanned level and the torch does not correspond to the-adjusted relationship, a limit switch is depressed by a cam and thereby the motor is switched on for the correction movement. The feeling result may also be transmited by the feeler wheel to the flame machine with the aid of an endless belt displaceable in synchronism with the workpiece on which the level differences at the feeling site are recorded, scanning of the resulting adjustment of the flame machine being effected by means of a control device which, photoelectrically controlled, follows the recording and supports the cams necessary for the limit switch actuation. The belt is conveniently cancelled after passing the control device.

The advantage of the method in accordance with the invention is that the feeling takes place at an equivalent other point of the workpiece of the ideal feeling position outside the direct proximity of the torch or at an ideal feeling position at a point of the workpiece equivalent to the actual flame position, in location and time in front of the flaming process, e.g. several roller graduations of the supporting roller track in front of the position on the flame torch, where the feeling or scanning of the workpiece is to take place ideally.

Examples in accordance with the invention are illustrated in the accompanying drawings in which:

FIG. 1 shows an embodiment of an automatic nozzle clearance adjustment with scanning at an ideal equivalent feeling position on the workpiece and FIG. 2 shows an embodiment of the automatic nozzle clearance adjustment with the feeling at the ideal feeling position on the workpiece at an equivalent position.

A slab 1 to be flamed is passed below a flame torch 3 on a roller track 2 at flaming speed. The slab 1 on account of the preceding rolling or casting process is of equal thickness over its whole length within close limits. A feeler roller 4 is urged into position by a spring 5 and follows the deformations of the slab 1 on the underside. A shaft 6 of the feeler roller 4 is equipped with cams 7 which then actuate limit switches 9 connected to a vertical slide 8. The limit switches depending upon the direction of the deformation switch on a motor 10 which via a gearing 11 rotates a spindle 12, whereby the vertical slide provided with a spindle nut 13 is displaced upwardly or downwardly. A slide guide 14 is fixedly mounted over the flame roller track 2. The movement of the torch 3 caused by the motor 10 follows the curvature of the slab 1 traced by the feeler roller 4 until the momentary limit switch 9 is no longer depressed by the corresponding switching cam 7. At this instant the motor 10 is switched off since the slab 1, feeler roller 4 and torch now again assume the correct relationship to one another, which signifies that the required nozzle clearance has again been obtained.

In the embodiment according to FIG. 2 a slab 1 to be flamed moves on a roller track 22 in the direction of a flame torch 23. A feeler roller 24 operates with spaced relationship of a triple roller graduation T along the slab 21. Movements of the feeler roller 24 caused by the curvatures of the slab are recorded by means of a recording device 25 on a belt 26 in the form of a line extending in synchronism with the slab. By means of a photo-electric cell 27, which assumes the correct relationship with the ideal feeling point, the line is recorded on the land. Known electronic devices in connection with motors and the like permit the photo-electric cell 27 constantly to follow the level of the line on the band 26. Switching cams 29 on a moving control device 28 supporting the photo-electric cell 27 actuate the limit switches connected to a vertical slide 31 for the torch. The limit switches 30, depending upon the direction of the line on the transfer band, switch on the motor 32, which via a gearing 33 rotates the spindle 34, whereby the vertical slide 31 provided with a spindle nut 35 is displaced upwardly and downwardly in its slide guide 36. The slide guide 36 is fixedly mounted over the flame roller track 22. The movement of the torch 23 caused by the motor 32 follows the previously traced curvature of the slab 1 until the momentary limit switch 30 is no longer depressed by the corresponding switching cam 29 on the control device 28. At this instant the motor 32 is switched off, since the just flamed position of the slab 21 in its vertical position correspondents to the position of the photo-electric cell 27 on the control device 28, the latter now assuming the correct relationship to the torch 23. This signifies that the required nozzle distance has been attained. The necessary synchronous speed between the endless band 26 and the slab 21 is produced by a bevel gearing 37 and the drive of the roller track 22. The line on the band 26 is cancelled, after scanning by the photo-electric cell 27, at a cancelling head 38 which, for example, operates with a wiper which is saturated with a suitable cleansing fluid and a subsequent drier.

In the operation FIGS. 1 and 2 of the drawings show that the scanning of the workpiece is effected mechanically by rollers (4, 24). The region in which the rollers are in engagement with the workpiece is not affected by the flame of the torch in order to prevent the scanning device from being damaged. The size of this region not affected by the flame depends upon the intensity of the flame. The vertical adjustment of the torch, as shown especially in FIG. 1, is as follows: The shaft 6 of the scanning roller 4 is provided with cams 7 which actuate the end switch 9 connected with the vertical traverse 8 of the torch. The end switches each switch on the motor 10, depending upon the direction of deformation of the motor 10, via a gearing 11 rotating the spindle 12, whereby the vertical traverse provided with a spindle nut 13 is actuated upwards or downwards in the traverse guide 14. The traverse guide 14 is fixedly mounted over the flame roller track 2. The movement of the torch 3 caused by motor 10 follows the curvature of the slab 1 recontrolled by the scanning roller 4 until the relevant end switch 9 is no longer depressed by the corresponding switching cam 7. At this moment the motor 10 is switched off, since the slab 1, scanning roller 4 and torch 3 are again in a correct relationship with one another, which means that the required nozzle distance has again been reached. In the embodiment shown in FIG. 2, the vertical adjustment of the torch occurs in principle in a like manner, with the difference that between the feeler roller 24 and the igniting switch 30, an information carrier 26 and a control device 28 for converting the information into movement is incorporated.

The scanning in FIGURE 1 is shown effected on the underside of the workpiece, in FIGURE 2 the flame is positioned in advance with adequate clearance. Thus the scanning of the workpiece always occurs at a point unaffected by the flame.

The advantages of the described examples reside in the fact that when scanning, disturbing influences due to temperature, gas jets, flame slag and splashes by water in the proximity of the torch are avoided. Conditions given by the torch construction remain insignificant.

The first described simpler embodiment may be used only in the case of stationary flame machines, only by surface flaming and only with transporting the slab by means of a roller track. The somewhat more elaborate second embodiment may accordingly be put into operation on any surface which is to be flame treated. It may also be used when flaming four sides simultaneously. The method of conveying the slab on a roller track or trolley has not decisive part in this controlling method. This method may also be used in displaceable flame treating machines in which the feeling device moves together with the flame machine.

I claim:

1. A method of automatically controlling the distance of the nozzle of a torch from a workpiece comprising the steps of scanning distance of the surface of said workpiece relative to said torch, by adjusting the nozzle in response to signals received from said scanning of the surface of the workpiece, said scanning taking place in a region unaffected by the flame directed from the nozzle when the nozzle has been adjusted as a result of a signal consequent upon said scanning in said region.

2. A method of automatically controlling the distance of the nozzle of a torch from a workpiece according to claim 1, said step of adjusting said nozzle occurring by movement of said nozzle and to a line of travel of the surface of the workpiece in relation to the nozzle and scanning a given part of the surface before said part of the surface is impinged upon by the flame.

3. A method of automatically controlling the distance of the nozzle of a torch from a workpiece according to claim 1 further comprising the step of continuously comparing the position of said given part of the surface with the position of said nozzle.

4. A method of automatically controlling the distance of the nozzle of a torch from a workpiece according to claim 2 further comprising the step of traversing the workpiece past the nozzle.

5. A method to effect said travel according to claim 3 further comprising the step of traversing the torch along the workpiece.

6. A method to effect said travel according to claim 5 further comprising the steps of making a record in response to the signals received from said scanning of the surface of the workpiece and of continuously comparing the part of said record corresponding to the position of a given part of the surface with the position of the nozzle.

7. A method of automatically controlling the distance of a torch nozzle from a workpiece as claimed in claim 1, said steps of scanning including maintaining said region of the workpiece which is opposite to the surface impinged upon by said flame, unaffected by the flame.

References Cited

UNITED STATES PATENTS 3,153,109  10/1964  Steventon et al. _____ 148—9

L. DEWAYNE RUTLEDGE, *Primary Examiner.*

WAYLAND W. STALLARD, *Assistant Examiner.*

U.S. Cl. X.R.

266—23